United States Patent
Payne et al.

(10) Patent No.: US 7,249,319 B1
(45) Date of Patent: Jul. 24, 2007

(54) SMARTLY FORMATTED PRINT IN TOOLBAR

(75) Inventors: Christopher D. Payne, Seattle, WA (US); Oliver Hurst-Hiller, Seattle, WA (US); Eric Watson, Redmond, WA (US); Brett D. Brewer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 10/743,637

(22) Filed: Dec. 22, 2003

(51) Int. Cl.
*G06F 17/00* (2006.01)
*G09G 5/00* (2006.01)

(52) U.S. Cl. ...................... 715/527; 345/619
(58) Field of Classification Search ........ 715/500–542; 707/1–8; 717/141–148; 345/619
See application file for complete search history.

(56) References Cited

U.S. PATENT DOCUMENTS

| | | | |
|---|---|---|---|
| 5,404,442 A * | 4/1995 | Foster et al. ................ 715/769 |
| 5,765,156 A | 6/1998 | Guzak et al. | |
| 5,794,178 A * | 8/1998 | Caid et al. ..................... 704/9 |
| 5,924,099 A | 7/1999 | Guzak et al. | |
| 6,356,908 B1 * | 3/2002 | Brown et al. ................ 707/10 |
| 6,418,433 B1 * | 7/2002 | Chakrabarti et al. .......... 707/5 |
| 6,526,440 B1 | 2/2003 | Bharat | |
| 6,529,903 B2 | 3/2003 | Smith et al. | |
| 6,615,209 B1 | 9/2003 | Gomes et al. | |
| 6,638,314 B1 * | 10/2003 | Meyerzon et al. .......... 715/513 |
| 6,658,423 B1 | 12/2003 | Pugh et al. | |
| 6,678,681 B1 | 1/2004 | Brin | |
| 6,920,609 B1 * | 7/2005 | Manber et al. ............. 715/513 |
| 2001/0044810 A1 * | 11/2001 | Timmons .................... 707/513 |
| 2002/0123988 A1 | 9/2002 | Dean et al. | |
| 2002/0133481 A1 | 9/2002 | Smith et al. | |
| 2004/0105127 A1 * | 6/2004 | Cudd et al. ................ 358/1.18 |
| 2004/0139169 A1 * | 7/2004 | O'Brien et al. ............. 709/217 |

OTHER PUBLICATIONS

Courter et al., "Mastering Microsoft Office 2000", SYBEX Inc, 1999, p. 295.*
Sergey Brin, et al., The Anatomy of a Large-Scale Hypertextual Web Search Engine, Stanford University, 1998, pp. 1-18.
Clickability-PRINT THIS, http://www.clickability.com/solutions/interactivity/pt, viewed on Sep. 12, 2003, 1 page.

* cited by examiner

*Primary Examiner*—Kee M. Tung
*Assistant Examiner*—Michelle K Lay
(74) *Attorney, Agent, or Firm*—Amin, Turocy & Calvin, LLP

(57) ABSTRACT

The subject invention provides for systems and methods that allow a web user to more easily and readily print what they actually want to print and at the same time, mitigates user frustration that often ensues from poor web page printing. More specifically, the subject invention involves deciphering a structure or layout of any web page on the Internet. When a user employs the present print feature, the invention can be invoked to analyze the structure of a current web page to automatically generate a print preview page of the current web page. After analyzing the current web page, extraneous content of the page that is deemed to be non-critical or non-essential to that web page can be removed for printing purposes. Furthermore, previous knowledge learned regarding web page structure can be applied to determine the page and/or content structure of the current page to facilitate generating the print preview page.

36 Claims, 9 Drawing Sheets

SMARTLY FORMATTED PRINT IN TOOLBAR

TECHNICAL FIELD

This invention is related to systems and methods that facilitate online printing and in particular, that employ smart techniques to allow a user to obtain a smartly formatted print version of a desired portion(s) of any webpage(s).

BACKGROUND OF THE INVENTION

The advent of global communications networks such as the Internet has presented commercial opportunities for reaching vast numbers of potential customers. In particular, the Internet has become a major platform for advertising, allowing local and regional businesses to reach more states and more customers across the country. Due to the lower costs and wider distribution areas, advertising via the Internet is often more preferred than other, more conventional tactics such as print-ads and billboards. As a result, websites have become cluttered with various types of advertisements such as banner advertisements located at different positions throughout a web page and/or website. In addition to advertising content, most web pages typically have navigation panels including site indices, table of contents, search bar, and the like to assist a web user in maneuvering through the site. Moreover, there is usually a large amount of extraneous content on any given web page, which can make printing web pages a challenge.

Printing information off of a web page or site such news stories, research articles, lottery numbers, sports scores, and the like can often be a difficult and frustrating process. When a user wants to print a web page, they are usually only interested in seeing the defining content (e.g., news story, sports scores, etc.) on the printed page and not the extraneous content. Furthermore, some web pages cannot be printed as they appear, particularly for those users who want to print the entire web page. For example, some portion of the page can be inadvertently cut off during printing or cannot be printed without substantially modifying the print paper size and/or margins.

In an attempt to resolve this problem, a few web sites offer a print friendly version option. However, this feature is only available from such particular sites that have specifically included or paid for this feature. In some cases, a web use may want to print some "non-useful" portion of a web page but not the entire page and/or not all the printable pages. The conventional print user friendly option currently employed produces only one configuration and does not allow a user to select which portions of the page to print. Conversely, using a general print option on a browser causes too much unnecessary information to be printed. Hence, this attempt has not been able to resolve online printing. Moreover, printing desired content off of web pages can often be and still is unproductive and inefficient.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods that allow a web user to more easily and readily print what they actually want to print and at the same time, mitigates user frustration that often ensues from poor web page printing. More specifically, the subject invention involves deciphering a structure or layout of any web page on the Internet. When a user employs the present smartly formatted print feature, a system and method can be invoked which can analyze the structure of a current web page. Furthermore, previous knowledge learned regarding web page structure can be applied to determine the page and/or content structure of the current page.

After analyzing the current page, extraneous components or content of the page that are not deemed to be critical to that page can be removed for printing purposes. For example, advertisements as well as navigation (e.g., navigation bar, menu, or index) can be removed from a preview version of the printable page. Alternatively, if it is determined that an advertisement is material or core to the content of the page, that content (advertisement) can be retained or re-inserted, if initially removed. In general, the present invention returns to the user the most critical or desired (e.g., user-defined) components of the page formatted in a usable manner.

According to an aspect of the present invention, the HTML (Hypertext Markup Language) structure of a plurality of web pages, for example, can be analyzed to facilitate understanding web page architecture in general. As a result, this knowledge can be utilized to identify different types of content throughout these pages as well as subsequent pages. For instance, some web pages are created to have a table format structure or layout. Thus, the page can be divided into such tables, wherein each table contains some type of content such as text or images. Through analysis, tables (e.g., sections of the page, if not in table format) that have a relatively high text density can be identified as the primary or defining content of the page. The primary or defining content of the page can refer to the focus of the page such as an article. This can also be referred to as the essential or critical content of the page. Likewise, non-essential, non-critical, or extraneous content can refer to advertising content, navigation content, and the like.

Tables having large images or clusters of images can likely be identified as advertisements. Most advertisements currently found on the Internet have standard sizes and/or dimensions, thereby making them easier to readily identify. Other features that can be examined include word frequency and keyword density. In particular, some words can be so frequently used that they can be given less weight (e.g., of importance) by a crawler when crawling sites. Conversely, the presence of other words such as search terms (e.g., keywords) can be denser compared to other words contained on the page. Hence, word density or frequency can indicate either non-essential or essential content.

According to another aspect of the invention, web page structure can also be ascertained by comparing an old version of a web page to an updated version of that page. In particular, previous pages that have been visited or crawled can be saved to a system cache (e.g., in a crawler's cache). When a web user revisits that web page (current page), the cached version of the page can compared to the current page to facilitate determining which areas have remained somewhat static and which areas have changed (e.g., non-static). It can be concluded with confidence that the desired or defining content of the page are probably located in such non-static areas of the page.

Thus, the present invention can identify page components (e.g., sections of a page) and then format and/or print (e.g., to file, to printer, to email, to fax) according to the user's preference in accordance with yet another aspect of the invention. More specifically, the user can select from a plurality of print options such as "choose for me", "as on screen", and "fit on screen", for example. "Choose for me" can allow the invention to essentially cut up or dissect the web page into critical and non-critical sections and then removes the non-critical sections from the printable page. The remaining critical sections can be formatted to properly fit on the printable page or pages. "As on screen" can allow the user to obtain a printable copy of the content of the webpage as it appears on the screen. Thus, some content that may be on the edge of the page will not be cut-off in the printed version as often occurs today. Finally, "fit on screen" can permit the web page to be formatted (e.g., resized) to fit on a 1×1 page, for example, or on any other number of desired pages.

According to still another aspect, longer web content that spans across many separate web pages (e.g., click "next page" to see next page of article) can also be formatted to become a single print document that comprises at least a subset of the separate web pages. This can be accomplished in part by selecting a "save to print" or "collect to print" option. For example, a department entitled "Kitchen Items" on an e-commerce website comprises 10 pages of kitchen tools and appliances. Thus, in order to see all the items, the user can be required to click on the various page numbers or "next page" to view the subsequent pages and/or to move between pages. In such instances, each page can include similar non-critical or extraneous content such as advertisements and navigation.

According to some traditional print methods, each of the 10 pages would have to be printed separately including any extraneous content. Other conventional print-friendly techniques permit the user to print all 10 pages as a single printed document instead of the 10 separate printed pages. However, this too includes any extraneous content. Unlike the previous conventional methods, the present invention allows at least a subset of the 10 pages to be formatted such as by removing any or all extraneous content. The remaining content can be modified to properly fit the page or as desired by the user. In keeping with the above example, the user can "collect to print" at least a subset of the 10 pages. Hence, if pages 1, 5, and 6 are collected for printing, they can be saved to a cache, organized as desired (e.g., moving content in page 6 in front of page 5) and formatted to create a new document. The new document, therefore, comprises at least a subset of the total number of web pages that were initially present. This new document can be printed using a single print command, for example. Hence, less time is needed for printing, thereby making it more efficient for the user.

According to still yet another aspect, collaborative filtering can be employed to further optimize the functionalities of the systems and methods. For example, user behavior can be monitored to determine whether web users are modifying automatically formatted printable pages, and if so, in what manner. Consistent user behaviors can be learned and then implemented in future print requests.

Moreover, the present invention can examine and learn web page structure across a plurality of web pages which allows for intelligent guesses to be made in regard to recognizing critical, and/or desirable content to print. Data can be collected from a web crawler(s) and/or one or more feed types (e.g., XML schema). Such data can be employed to facilitate distinguishing between defining content and extraneous content for presentation.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
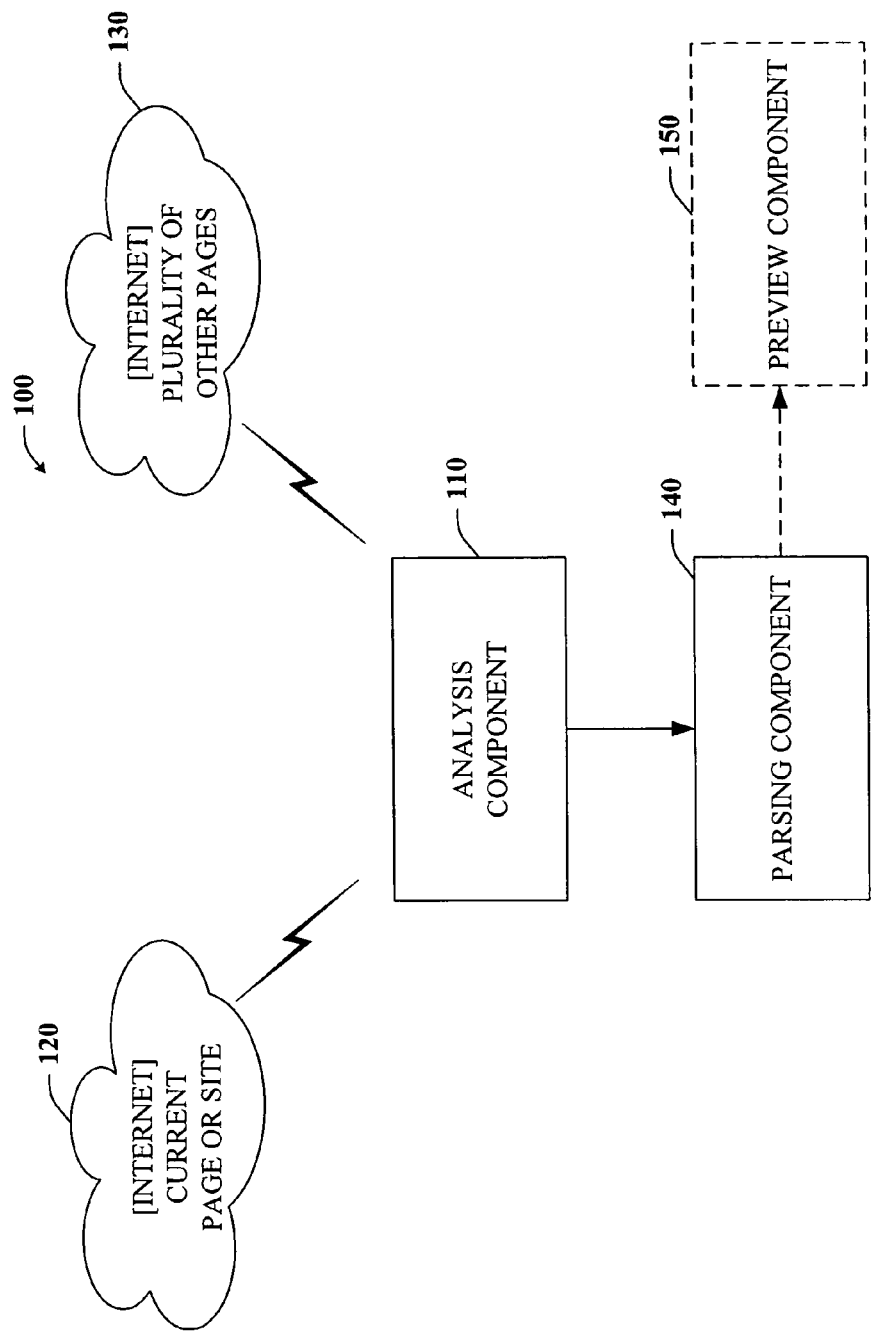
FIG. 1 is a high-level block diagram of a system that employs a smart print feature that facilitates printing only desired content parsed from any web page on the Internet in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with automatically determining essential and non-essential content of any web page or any web site. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that the present invention can be utilized and implemented by any type of online service provider for printing user-defined and/or user-desired content from any web site, any web page, or any number of web pages from a web site.

Referring now to FIG. 1, there is illustrated a high-level, general block diagram of a system 100 that facilitates deciphering the structure and/or content of any web page on the Internet in order to generate a more usable print copy of such web page. The system 100 comprises an analysis component 110 that can analyze the structure or architecture of the current page 120 as well as a plurality of other web pages 130. By analyzing the current page as well as a plurality of other web pages, the system 100 can gain a better understanding of web page architecture in general since most pages are arranged in a similar manner.

For instance, analysis of a web page can include examining table structure and text density. Many websites or web pages are comprised of a plurality of tables, wherein each table has a particular dimension, location, and/or general purpose (e.g., content-specific). Text density can refer to tables or portions of a page that comprise relatively more text per area than other areas of the page. In some cases, a section of the page having a greater text density can be identified as the defining content of the page such as a news article or story.

Observing the location of text or image content can also facilitate identifying content on the page. For example, complex table structures having relatively dense text on the left side of the page can most likely indicate navigation, site index, and/or a table of contents section of the page, all of which are usually not desired for printing. Furthermore, advertisements can have a general or standard size, such as 3"×3" for in-text ads and 1"×4" for banner ads. Thus, tables or content in general located in standard advertisement locations of a page and having standard or typical dimensions can be readily identified as such.

Once a page has been analyzed for its content, a parsing component 140 can be employed to cut up or dissect the page in preparation for printing. In particular, content estimated or determined to be non-relevant to the user or to a printable page, can be removed from a preview version of the page. The remaining content of the page which is presumably the defining or desired content can be re-formatted to properly fit onto at least one page for printing. Web users can choose whether they prefer the system 100 to choose the relevant content for them or if they would like to select their desired content by themselves (e.g., user-defined) for printing.

Overall, information gained from analyzing a plurality of web pages can serve as a foundation or baseline for determining how web pages of a certain kind, or in general, are structured. For example, e-commerce web pages can be structured somewhat differently from news web pages. Thus, learning the differences can facilitate identifying different types of content on any particular web page.

In practice, imagine a user is on www.amazon.com ("amazon.com"), a retail or e-commerce website. Amazon.com contains hundreds if not thousands of pages throughout its many departments. Next, imagine the user wants to print a book review from the site. Without any other background knowledge of e-commerce sites, the parsing component 140 would have great difficulty in successfully identifying extraneous or critical content on the page, and then dissecting the page into the respective sections. This is largely because there is no other background information on e-commerce websites to contribute to the analysis of the current page. Hence, it can be nearly impossible to determine and/or distinguish between the various types of content on the current page without the relevant background information. However, by analyzing a plurality of (e.g., or substantially all) pages from the Amazon site as well as other e-commerce web sites, the system 100 can gain an understanding and working knowledge that e-commerce sites are generally built, for example, with a set of similar components such as D, E, and F that are structured in a q-p lay out, to thereby facilitate identifying content as well as ascertaining which parts can be removed.

Still referring to FIG. 1, the system 100 can also include a preview component 150 that allows web users to verify the content and/or the format of the content that has been prepared for printing. In one aspect, the preview component 150 provides the user with an ability to override content chosen by the system 100. For example, if for some reason, an advertisement is part of the desired or essential content, the user can add this back into the printable page. Similarly, the preview component permits the user to rearrange the content (e.g., move tables) prepared for printing according to his/her preferences.

Moreover, the present invention can be carried out without authoring control. That is, no authoring control of any website or web page is necessary for modifying a printable page as described hereinabove. Likewise, no explicit indicators or tags relating to formatting the page for printing need to be present in the main body of the page or in the source code of the page. The system 100 can simply analyze the structure of the website or page and identify content on the page as previously discussed.

Figure 2:
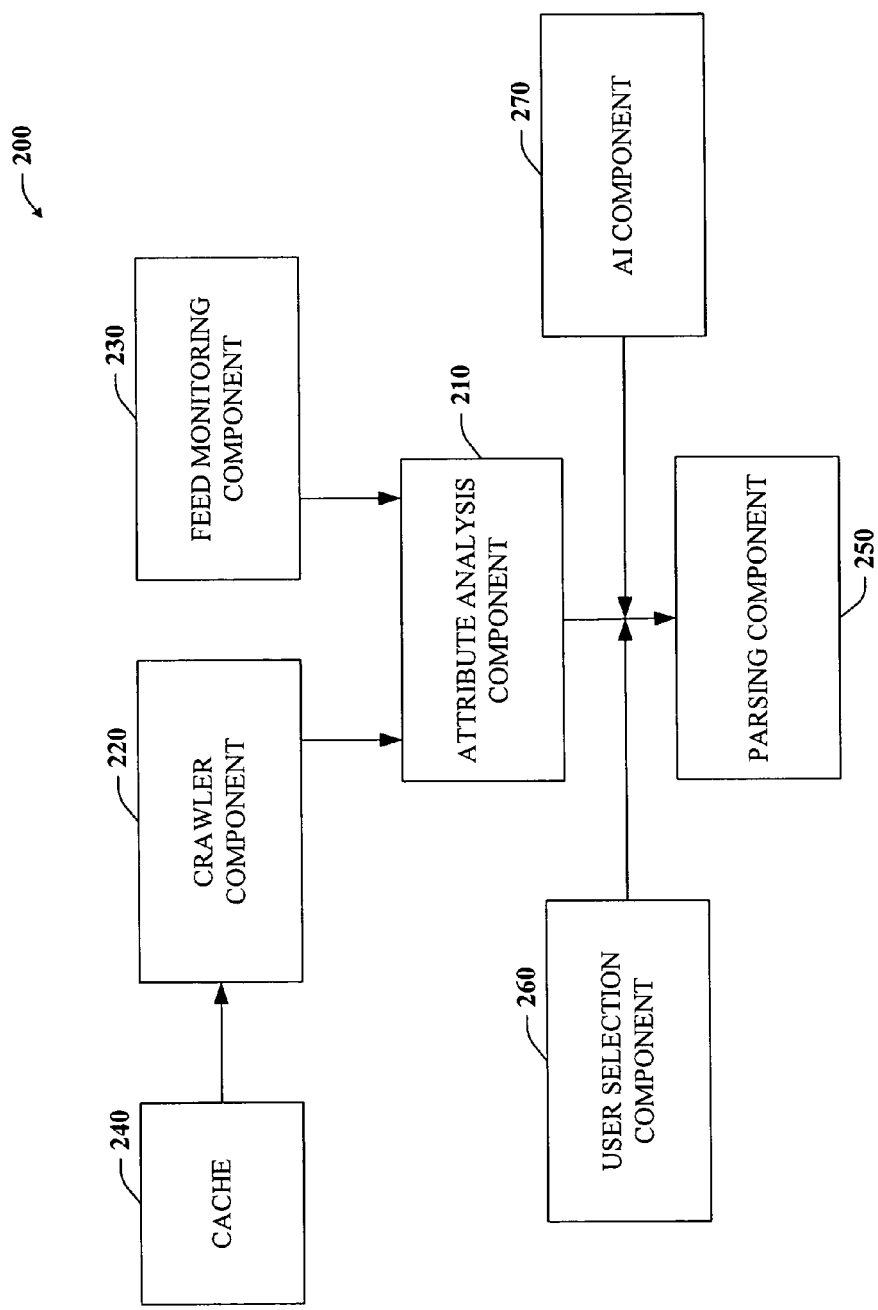
FIG. 2 is schematic block diagram of a system that employs a smart print feature that facilitates printing only desired content parsed from any web page on the Internet based in part on data collected via a crawler component and a feed component in accordance with an aspect of the present invention.

Turning now to FIG. 2, there is illustrated a block diagram of a system 200 that facilitates determining the structure of any web page on the Internet in accordance with an aspect of the present invention. The system 200 includes an attribute analysis component 210 that analyzes data received from a crawler component 220 and/or a feed monitoring component 230. The crawler component 220 can be any type of web crawler. In general, a crawler is a program that visits web sites and reads their pages and other information in order to create entries for a search engine index. The major search engines on the web have such a program, which can also be referred to as a "spider" or a "bot."

Crawlers are typically programmed to visit sites that have been submitted by their owners as new or updated. Entire sites or specific pages can be selectively visited and indexed. Crawlers can crawl through a site one page at a time, following the links to other pages on the site until all pages have been read. Thus, the crawler component 220 maintains a vast amount of knowledge that can be shared with various components of the system 200 to ascertain web page architecture for similar types of sites (e.g., e-commerce, news, encyclopedia, email, maps, etc.) as well as for web sites in general.

As previously mentioned, web page structure can also be ascertained by comparing an older version of a web page to an updated version of that same page. In particular, previous pages that have been visited or crawled can be saved to a cache 240. The cache can be operatively connected to the crawler component 220 or be part of a system cache (not shown). When a web user revisits that web page (current page), the cached version of the page can compared to the current page to facilitate determining which areas have remained somewhat static and which areas have changed (e.g., non-static).

The attribute analysis component 210 can compare the cached page to the current page to ascertain which portions of the current page have remained static and which portions have changed from the cached page. This type of analysis can assist in identifying and determining locations of content, and in particular, different types of content. For example, on a news website such as www.nbc.com, four sections or tables of the page have not changed in the last three months but the center section or table has changed. Thus, it can be logically concluded that the four static sections include non-essential information such as advertisements and navigation, whereas the center section most likely includes the essential content such a news article.

Still referring to FIG. 2, data can also be obtained from monitoring various types of feeds via XML schema by way of the feed monitoring component 230. XML schemas instruct web sites on how to deliver their data to keep similar types of web sites and search engines consistent. For example, an XML schema can direct 1000's of shopping engines on how to provide consistent data in the feed. The feed can have a sku field, description field, URL field, etc. as prescribed by the XML schema. In an RSS feed, which is specific to news sites, the feed may have a title or heading field as well as author, date, and body fields.

Data from the various feeds can be compared to the data that is crawled or that is generated from the crawler component by the attribute analysis component 210 to gain a better understanding of web page attributes. Such analyses can facilitate distinguishing between the defining and the extraneous content to optimize presentation of the defining content for the web user.

Once the one or more web pages have been analyzed, a parsing component 250 can format or otherwise modify the one or more pages for printing. For instance, the parsing component 250 can perform auto-splitting of a page by table structure or by simply removing non-critical content such as advertisements, navigation, and/or any other selection chosen or desired by the web user. In particular, a user selection component 260, such as a pointer device or other input device, can be invoked by the user to highlight or select the desired sections for printing and/or the desired sections for removal (e.g., to hide during printing).

Some web documents can be relatively large in size and in length. For example, a web document 400 pages long can be auto-split by topical sections (e.g., major sections of a document larger than w pages are selected for printing, wherein w is an integer greater than or equal to one). In practice, the various major sections of the document can be outlined with boxes and such boxes can be adjusted by the user by appropriately moving handle bar features on such boxes. Hence, a "review and change" kind of feature can be provided to the user to adjust and/or modify a preview version of the printable page.

The parsing component 250 can also format and/or reorganize any number of pages for a single print command. This can be particularly useful for websites which provide their information on several separate or broken pages, with each page indicating "next page" or "page 1 of _" or the like on the page. For example, imagine that a web user would like to print 20 pages from a web site but hitting the conventional "print" command twenty times would be time consuming and inefficient. In accordance with the present invention, the user could collect at least a subset of the pages desired for printing and then organize them for printing using a single print command.

Organization of the pages can include changing the order of the pages such bringing page 15 in front of page 9 and/or reorganizing the content on each particular page. Thus, a new document can essentially be created for printing purposes. In particular, the new document comprises a subset or grouping of the total number of separate pages. Additionally, the subset of pages can be modified to only include user-defined content (e.g., content desired by the user). Hence, out of the total 20 pages, the user can format, modify, and/or organize any subset of particular pages to create an entirely new document for printing purposes.

The parsing component 250 can also provide labels (e.g., visual or textual references) over any identifiable section or content of the page to readily identify them to the user. For example, identified advertising content can be labeled with "AD" over the particular content or section(s) of the page. This makes it easier for the user to recognize which content or sections to keep and which sections to remove for the purpose of printing (e.g., to file, to printer, etc.).

The system 200 can also include an AI component 270. The AI component 270 can comprise classifiers such as for example a Bayesian classifier, a support vector machine, and/or other type of classifier and/or other non-linear training system(s). The AI component 270 can facilitate performing inferences and/or utility-based determinations in accordance with the subject invention. For example, the AI component 270 can perform a utility-based analysis in connection with automatically formulating and providing preview versions of a printable page with or without consideration of user preferences or of past user behavior (e.g., cost of making mistakes when cutting up the page, when to override classifier(s) with user preferences and vice versa, etc.).

Figure 3:
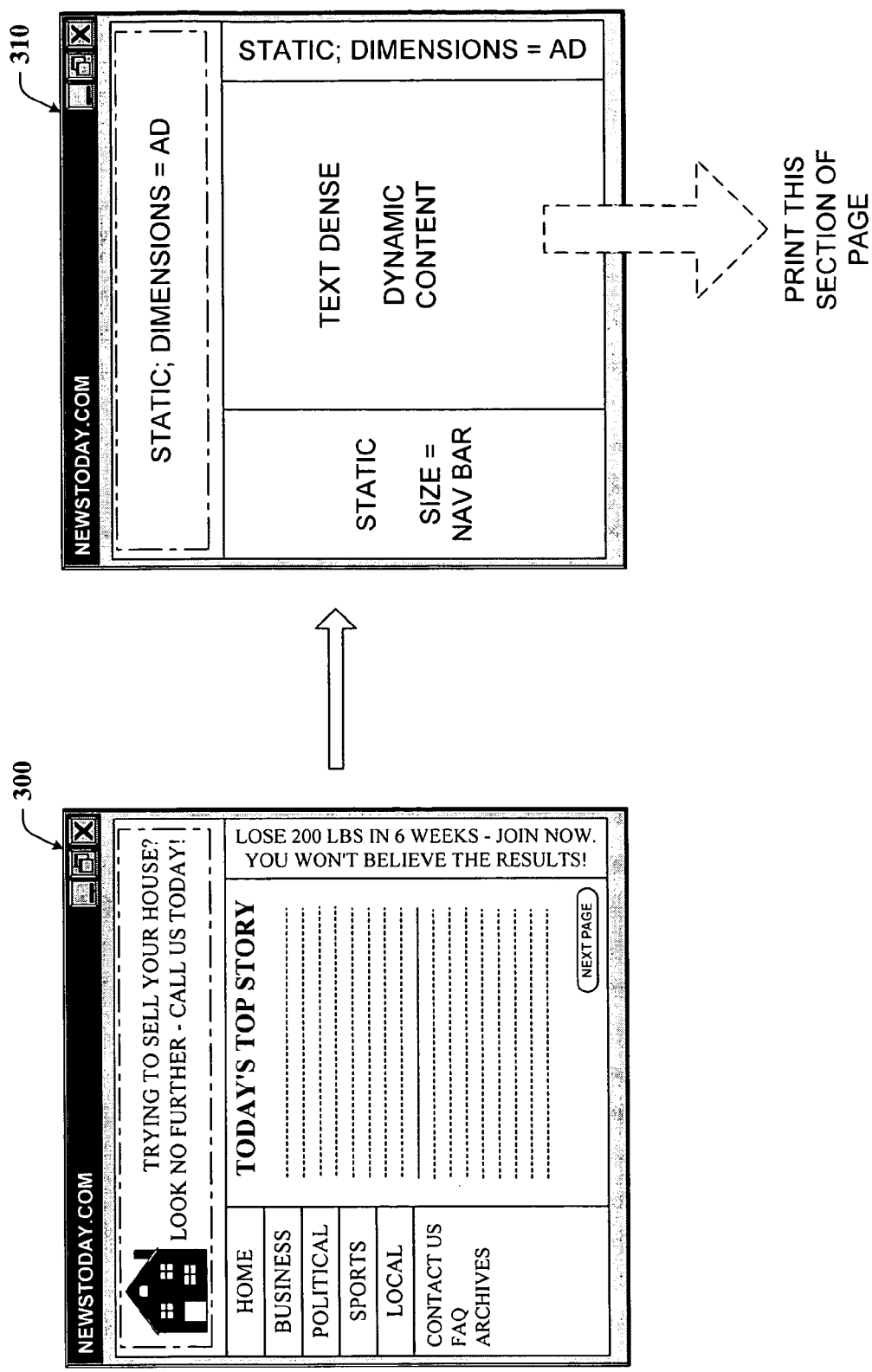
FIG. 3 is an exemplary user interface of a web page and a corresponding analysis of the web page for printing purposes in accordance with an aspect of the present invention.

FIGS. 3-6 represent exemplary user interfaces that demonstrate one or more aspects of the subject invention as described hereinabove. Referring to FIG. 3, there is illustrated a user interface of a web page 300 and a visualization 310 of a page (300) being parsed as a result of an analysis of the page's 300 structure. The web page 300 is representative of any typical web page on the Internet. The visualization 310 of the page being parsed can depict an intermediate stage that may or may not be shown to the user, wherein a parsing component (e.g., FIG. 2, supra) has identified various portions of the page as having static or non-static (dynamic) content with particular dimensions, for example. The portion designated for printing can also be indicated as such. The user can be shown this intermediate page to learn how printing determinations are made by the system and/or to adjust user preferences with respect to the identified portions.

Figure 4:
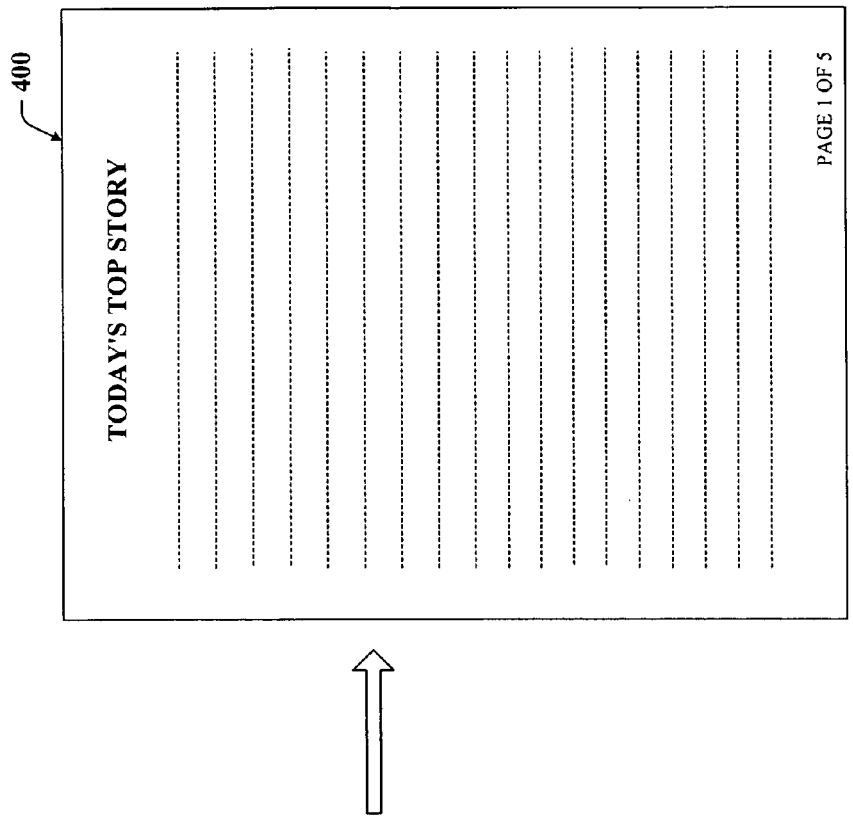
FIG. 4 is an exemplary user interface of a web page and a corresponding analysis of the web page for printing purposes in accordance with an aspect of the present invention.
Figure 4:
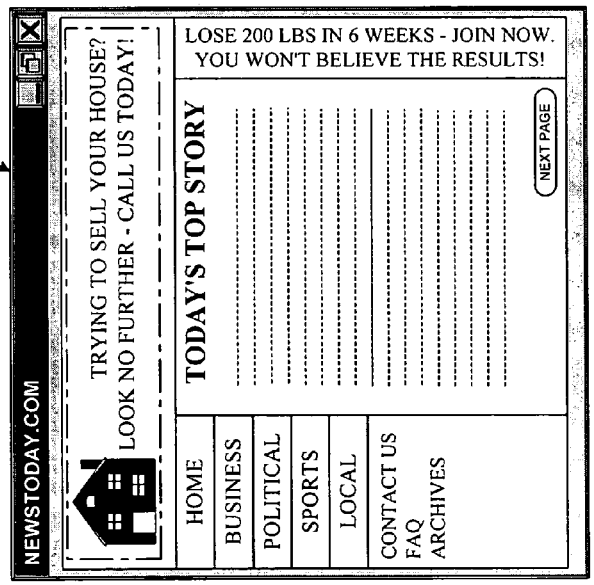

FIG. 4 can be a continuation of FIG. 3, whereby a printable page 400 indicates a print preview version of the web page 300. As can be seen, a body of text relating to a news story has been formatted to fit on at least one full printable page 410 because it has been deemed to be the defining content of the web page 300. At this point, a web user can modify the preview version such as by re-inserting a portion of the page that has been removed by a parsing component or by re-sizing the defining content.

Figure 5:
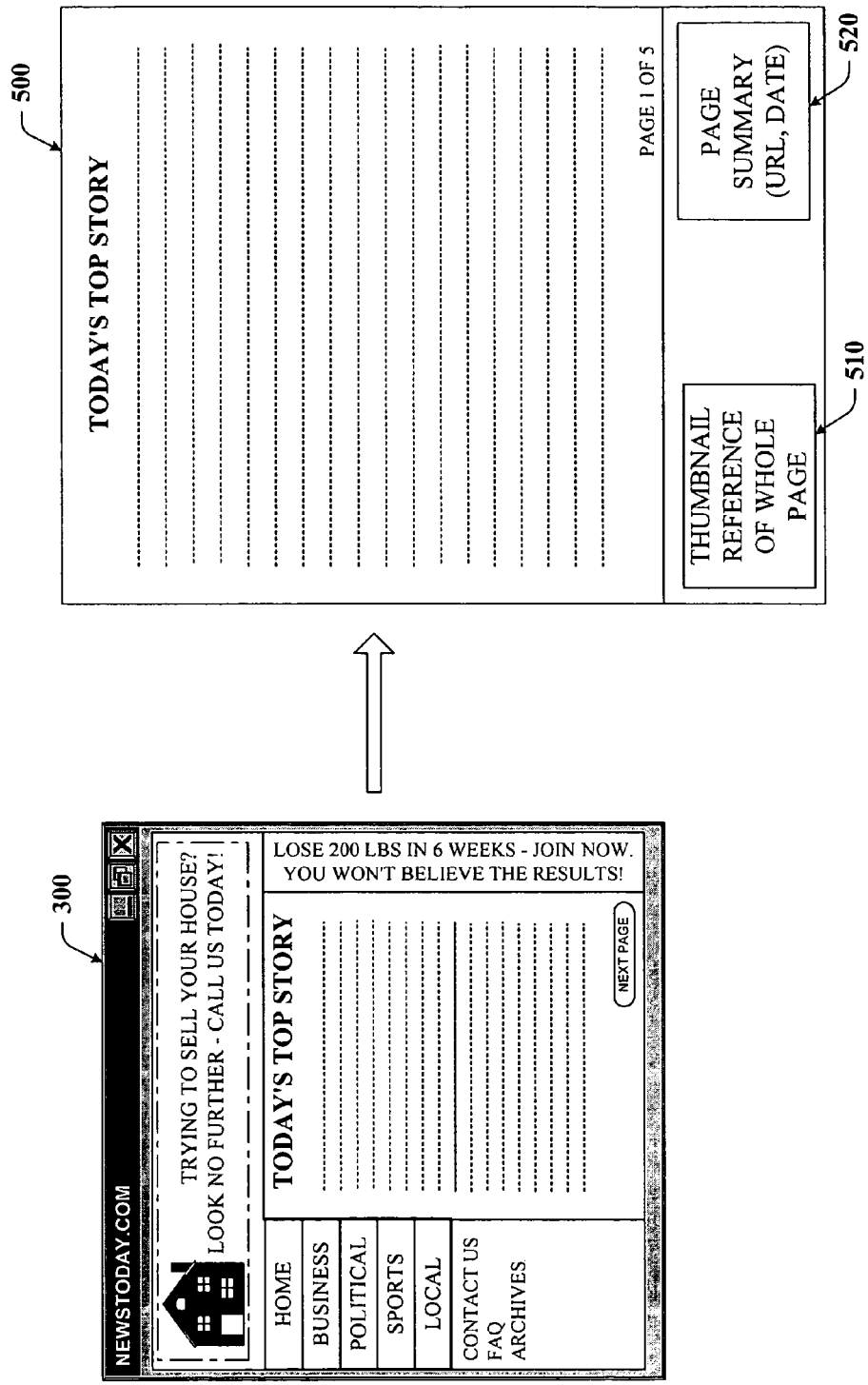
FIG. 5 is an exemplary user interface of a web page and a corresponding analysis of the web page for printing purposes in accordance with an aspect of the present invention.

In FIG. 5, a preview page 500 has been modified to appear differently from the page 400 in FIG. 4, supra. In particular, the preview page 500 includes a thumbnail reference 510 of the web page 300 (before it was parsed) so that a web user can maintain a frame of reference as to the original appearance and/or content of the web page. In addition, a thumbnail including a summary 520. of the web page such as URL location, date of print or access, and the like can also be added to the preview version of the page for the user's convenience. As a result, the page 500 has been formatted accordingly to accommodate the additions of the thumbnail and/or the page summary and to preserve an attractive and user-desired appearance of the defining content of the page (e.g., news article). Alternatively, the thumbnail reference and/or the page summary can be removed just prior to printing, if desired by the user.

Figure 6:
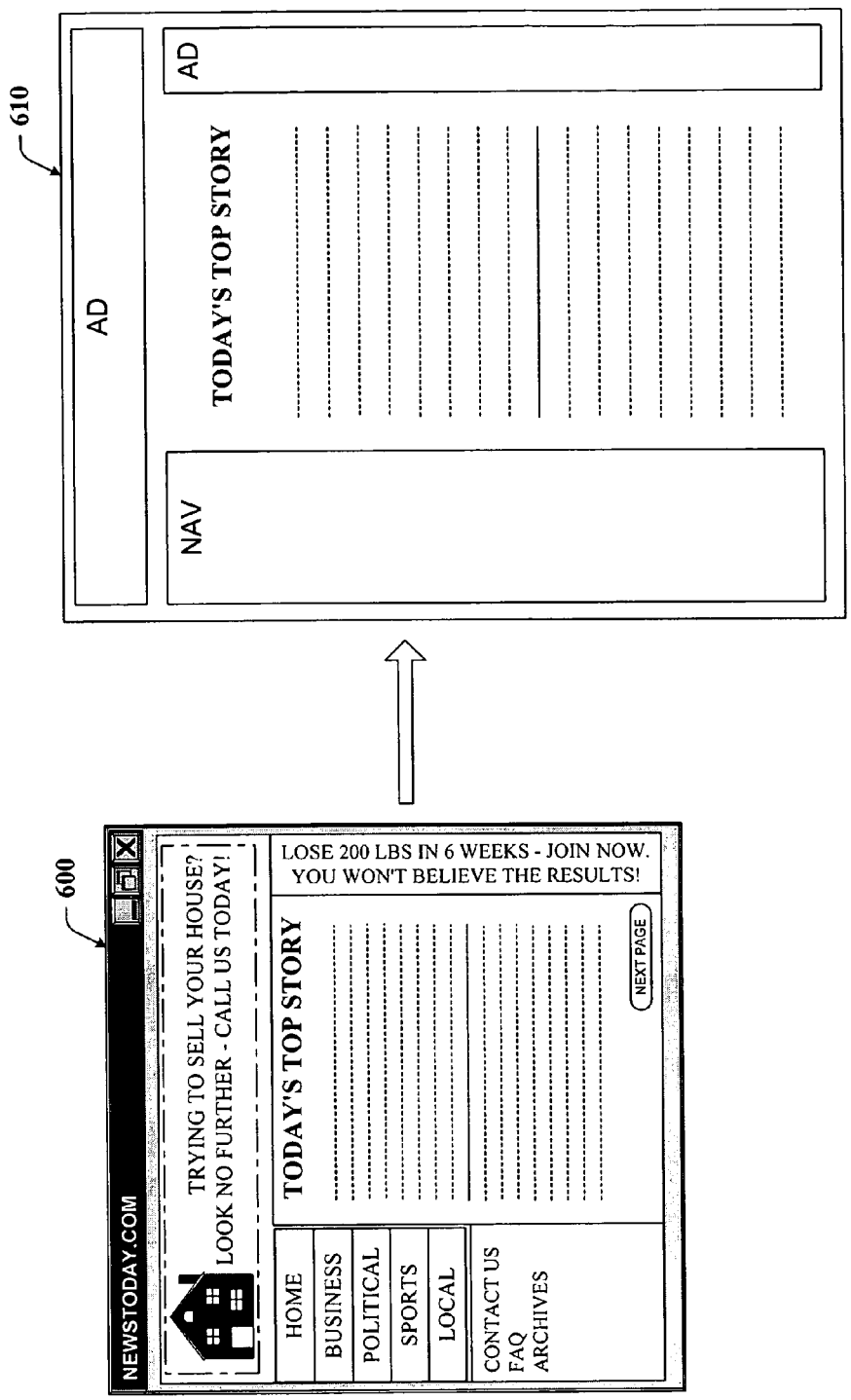
FIG. 6 is an exemplary user interface of a web page and a corresponding analysis of the web page for printing purposes in accordance with an aspect of the present invention.

Turning to FIG. 6, there is illustrated a print preview version 610 of a web page 600 in accordance with an aspect of the subject invention. The preview version 610 includes one or more visual and/or textual references to various sections of the page that have been identified by a parsing component, for example. In particular, the identified sections are "AD" which refers to advertisement and "NAV" which refers to page navigation. The visual or textual references can appear in a block style as shown and substantially cover the underlying content or can be transparently superimposed over the content. In the latter case, the content, in addition to the visual or textual reference, can still be viewed by the user. The visual and/or textual references assist the user to readily identify content on the page to make it easier to determine which sections of the page should be printed.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
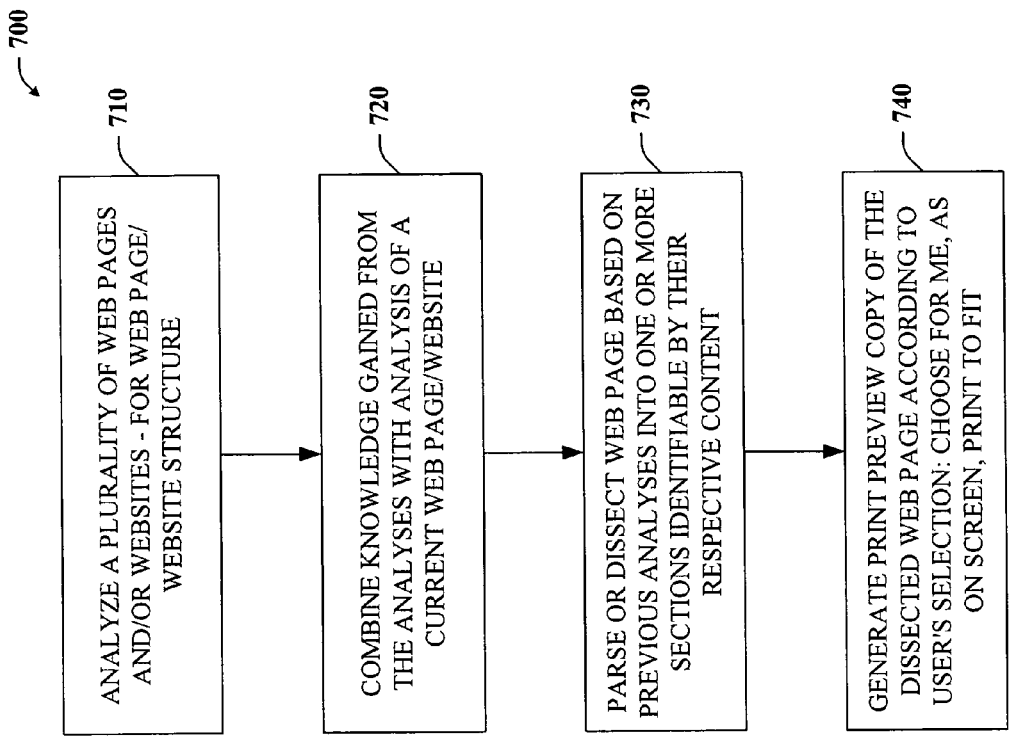
FIG. 7 is a flow diagram of an exemplary process that facilitates obtaining a smartly formatted printable page in accordance with an aspect of the present invention.

Referring now to FIG. 7, there is illustrated a flow diagram of an exemplary method 700 that facilitates creating a more useful print copy of a web page. The method 700 can begin at 710, wherein a plurality of web pages or web sites are analyzed with respect to their page or site structure. For example, text density, key word frequency, key word density, presence of images or groups of images, location of complex table structures, location of dense text, static status, non-static status, and/or layout of similar kinds (e.g., e-commerce, news) of web pages can be examined or looked for in web pages and/or web sites to understand and ascertain their architecture. Data that facilitates such analyses can be provided in part by a web crawler and/or by a feed in compliance with a XML schema.

The knowledge gained from such analysis can be combined with a similar analysis of a current page at 720. At 730, the current web page can be parsed or cut up into one or more sections that are identifiable by their respective content. The print copy of the webpage can then be formulated at 740 and presented to the user for modification or adjustments (e.g., formatting changes, removing additional section(s), re-inserting section(s), etc.). It should be appreciated that the print copy can be formulated according to the user's print selection of one of the following: choose for me, as on screen, and fit to page (e.g., 1×1 page). However, the user can still have the opportunity to modify the print (preview) copy before it is actually sent to be printed (e.g., to file for use in another application, to printer).

Figure 8:
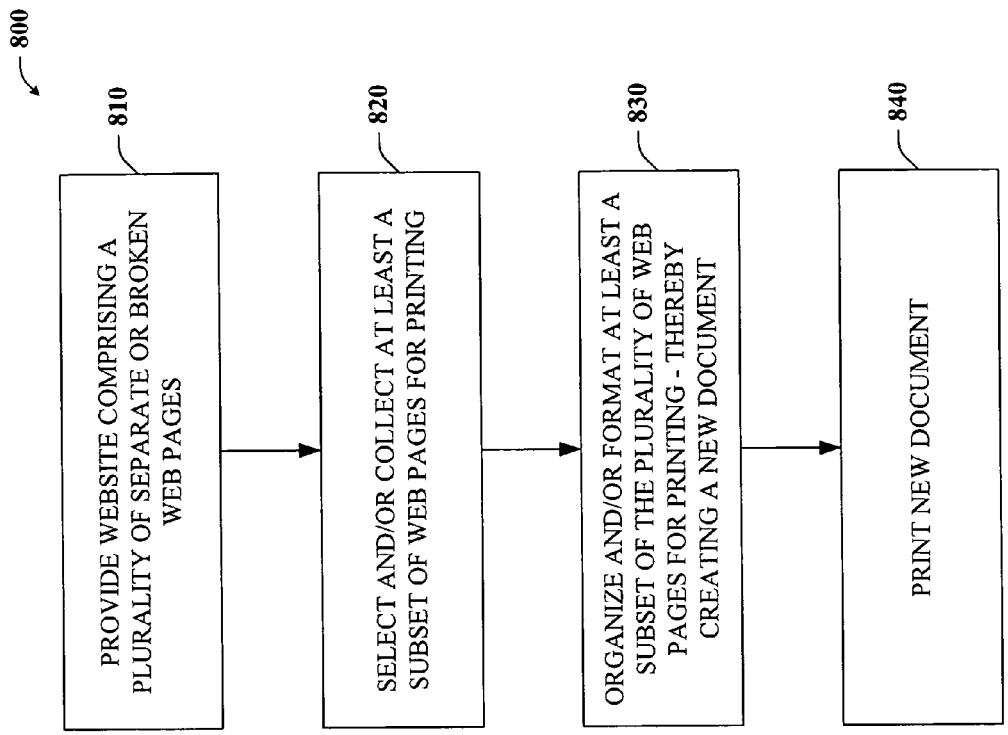
FIG. 8 is a flow diagram of an exemplary process that facilitates obtaining a smartly formatted printable page in accordance with an aspect of the present invention.

Referring now to FIG. 8, there is illustrated a flow diagram of an exemplary method 800 that facilitates printing a plurality of separate pages from a web site with a single print command. The method 800 begins at 810, wherein a website having many, separate pages (e.g., click on "next page" to view subsequent pages on site) is provided. At 820, each page desired for printing can be selected and collected for printing. At 830, the plurality of collected pages can be organized and formatted for printing in part by user in such a way that a new document comprising a subset of multiple, separate pages is created. This new document can then be printed by clicking on a print command, for example, at 840. Hence, a plurality of pages can be printed without having to click on a print command for each page. This can especially convenient when shopping through a web site for various parts to build an apparatus or machine.

For example, imagine that a web user desires to build a computer by purchasing the various parts from a computer parts store on the Internet. In the user's preparation, he/she wants to research parts, prices and performance ratings of different brands of parts. Thus, he/she shops at more than one online store. At each web site, the user can collect the particular page that includes his part. The particular pages collected may not be in the correct order and/or can include extraneous information such as other unnecessary parts, for example. However, the method 800 allows the user to organize and/or format the pages so that they appear according to the user's preferences. Therefore, the pages can be re-ordered and within each page, some portion of the content can be removed as desired. The remaining content can be re-sized according to the page dimensions and the user's preferences. Finally, the page or pages can be printed (e.g., to file or to printer) by clicking on a "print" command.

Figure 9:
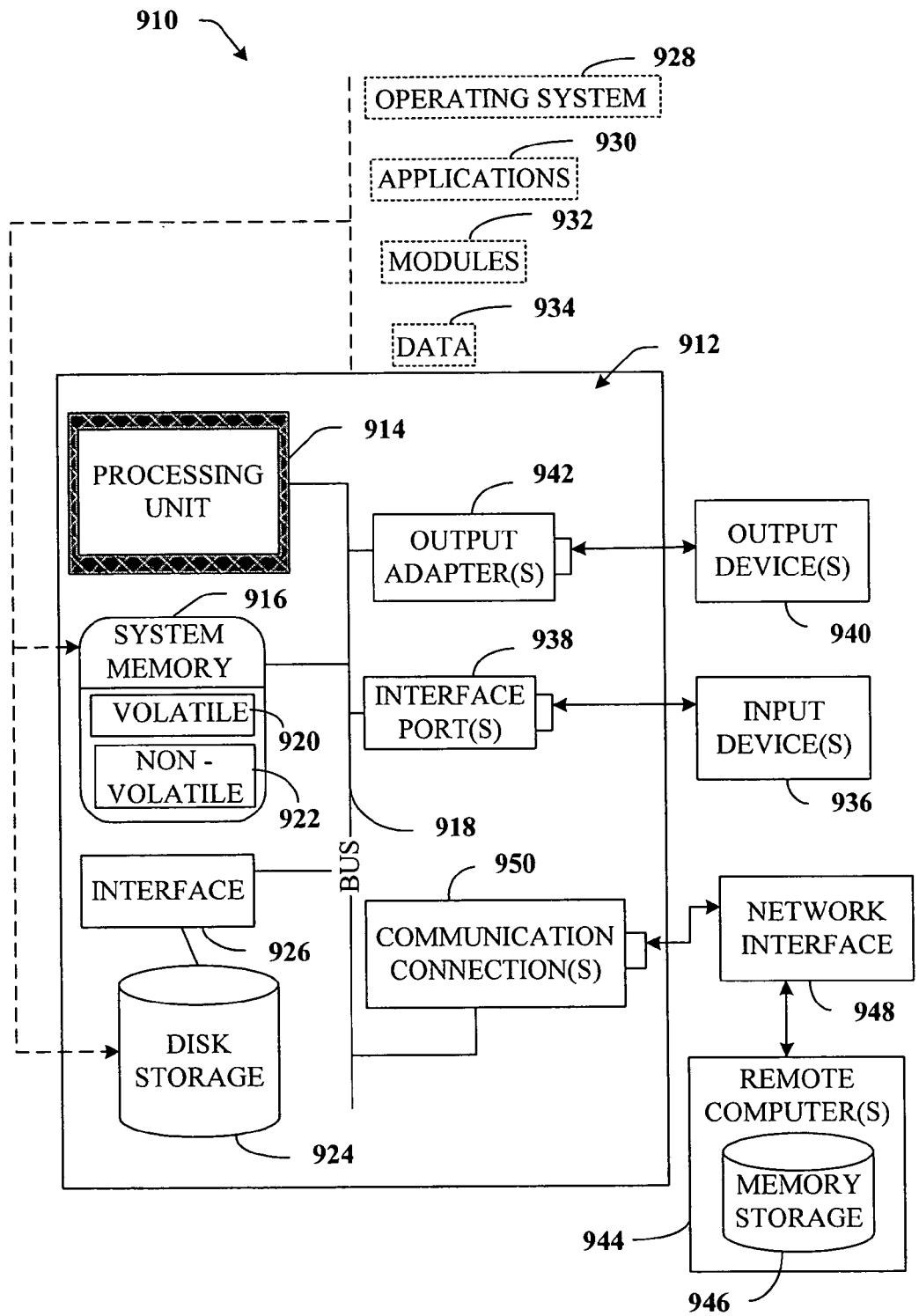
FIG. 9 is an exemplary environment for implementing various aspects of the invention.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples the system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates online printing for a web user comprising:
    an analysis component that analyzes data corresponding to a plurality of web pages, the plurality of web pages comprising at least a current web page, to facilitate identifying at least one section of the current web page;
    a parsing component that dissects the current web page to remove at least one identifiable section from printable view, the at least one section determined to be non-essential to defining content of the current web page based at least in part upon detecting a static section of the current webpage by comparing a prior version of the current web page to the current web page; and
    a preview component that visualizes a preview version of a printable page for a web user, disposes a thumbnail reference of the at least one current web page on a portion of the print preview version and allows the web user to modify the preview version according to user preferences.

2. The system of claim 1, the preview component allows the web user to verify whether the parsing component dissected the current web page according to user preferences.

3. The system of claim 1, the plurality of web pages further comprises at least one web page in addition to the current web page to facilitate deciphering architecture of the current web page.

4. The system of claim 1, the analysis component analyzes at least one of text density, key word density, key word frequency, table structure, location of dense text, location of one or more tables, presence of one or more images, location of one or more images, dimensions of one or more images, and dimensions of one or more tables.

5. The system of claim 1, the parsing component identifies one or more sections of the current web page based at least in part upon a portion of the data from the current web page that has been analyzed by the analysis component.

6. The system of claim 5, the parsing component labels one or more identified sections on the current web page with one or more textual or visual references to assist the web user in determining whether to remove one or more identified sections from the printable view.

7. The system of claim 5, the parsing component labels one or more identified sections on the current web page with one or more textual references to assist the web user in determining whether to remove one or more identified sections from the printable view.

8. The system of claim 1, further comprising a crawler component that provides data for analysis by the analysis component.

9. The system of claim 8, further comprising a cache component operatively connected to the crawler component, the cache component comprising one or more web pages stored for comparison to one or more updated pages that correspond thereto to facilitate determining location of content.

10. The system of claim 1, further comprising a feed monitoring component that monitors data from one or more feeds to facilitate deciphering content on at least the current web page for analysis by the analysis component.

11. The system of claim 1, non-essential data comprising advertisements and navigation information.

12. The system of claim 1 further comprising a user selection component that allows the web user to select which identifiable sections to keep or remove from the printable view.

13. The system of claim 1, the printable view corresponding to any one of following as chosen by the web user: one or more sections selected by the parsing component to be retained for printing, the current web page as it appears, and one or more sections of the current web page fit to a number of pages according to user preferences.

14. The system of claim 1 further comprising a preview version that facilitates further modification of content chosen by the parsing component.

15. The system of claim 14, the preview version facilitates re-inserting a portion of the content that has been removed by the parsing component, rearranging the content after reinsertion and making formatting changes to the rearranged content.

16. A system that facilitates providing a preview version of a printable page comprising:
    an attribute analysis component that analyzes data from one or more web pages, the one or more web pages comprising at least a current web page and at least one other web page;
    a parsing component that dissects the at least a current web page and removes at least one identifiable section from printable view;
    a preview component that generates a preview of the printable view with a thumbnail reference of the at least one current web page disposed on a portion of the generated print preview and provides a user with an ability to override content chosen by the system for printing; and
    an artificial intelligence (AI) component that performs a utility-based analysis in connection with analyzed data to automatically generate the preview version based at least in part upon a risk involved with removing the at least one identifiable section from printable view.

17. The system of claim 16, the AI component comprising a classifier.

18. The system of claim 16, the AI component inferring at least one of the following:
    when to employ user preferences;
    when to override user preferences;
    when to compare data from the current web page and the at least one other web page; and
    when to remove one or more sections from the preview version.

19. The system of claim 16, the AI component comprising at least one of: a support vector machine (SVM), a naïve Bayes model, a Bayesian network, a decision tree, a Hidden Markov Model (HMM), neural network, data fusion engine.

20. A method that determines web page architecture and facilitates identifying content on a web page to obtain a smartly formatted print version of a desired portion(s) of any web pages, comprising:

providing a plurality of web pages;

analyzing the plurality of web pages to identify at least one non-essential sector to facilitate identifying content and determining location of the content on at least a subset of the web pages to facilitate generating a user-defined printable page by partitioning and removing the at least one non-essential sector from at least one current web page, the non-essential sector is determined based at least in part by comparing a prior version of the at least one current web page to the at least one current web page to ascertain one or more portions of the at least one current web page that has remained static during updating of the at least one current web page;

generating a preview version of a user-defined printable page associated with the at least one current web page;

disposing a thumbnail reference of the at least one current web page on a portion of the generated print preview version; and facilitating user modification of a preview version of the user-defined printable page.

21. The method of claim 20, the plurality of web pages comprising the at least one current web page and at least one other web page.

22. The method of claim 21, further comprising printing the at least one current web page as it appears on screen.

23. The method of claim 20, analyzing the plurality of web pages for at least one of the following to facilitate identifying content and determining location of the content: text density, key word density, key word frequency, table structure, location of dense text, location of one or more table, presence of one or more images, location of one or more images, dimensions of one or more images, and dimensions of one or more tables.

24. The method of claim 20, further comprising determining layout structure of at least a subset of the web pages based at least in part on content identified thereon.

25. A method that facilitates printing one or more web pages comprising:

analyzing a plurality of web pages for their respective web structures to facilitate identifying content, the plurality of web pages comprising at least one current web page;

dissecting the at least one current web page based at least in part upon identifiable content into one or more sections that are subject to removal before printing;

generating a print preview version of a printable page to a web user, the preview version having one or more sections removed therefrom;

disposing a thumbnail reference of the at least one current web page on a portion of the generated print preview version, the thumbnail reference provides a view of a version of the at least one current web page prior to removal of the one or more sections.

26. The method of claim 25, dissecting the current web based at least in part upon user preferences.

27. The method of claim 25, further comprising collecting one or more current web pages and organizing the one or more current web pages, thereby generating a new printable document comprising at least a subset of the current web pages based at least in part upon user preferences.

28. The method of claim 25, further comprising printing the printable page to at least one of the following: to file, to printer, to email system, and to facsimile device.

29. The method of claim 25, identifiable content comprising advertisements, images, navigation, body of text and dynamic text.

30. The method of claim 25, adding a page summary to the preview version comprising a URL and a print date.

31. A computer implemented system that generates a print preview page of a web page comprising:

a component to generate the print preview page, the print preview page further comprises:

at least a subset of content parsed from a web page; and at least: a thumbnail reference of the at least one current web page prior to being parsed and optionally a summary of the web page.

32. The system of claim 31, the content of the print preview page is user-defined content.

33. The system of claim 31, the summary of the web page comprising a URL of the web page and a date on which the web page is accessed.

34. A computer-readable medium having stored thereon the following computer executable components for generating a smartly formatted print preview version of a web page:

an analysis component that analyzes data corresponding to a plurality of web pages, the plurality of web pages comprising at least a current web page, to facilitate identifying at least one section of the current web page;

a parsing component that dissects the current web page to remove at least one identifiable section from printable view based at least in part upon detecting that the at least one identifiable section has remained static during updates of the current web page by comparing a prior version of the current web page to the current web page, the at least one section being non-essential to defining content of the current web page; and a preview component that visualizes a preview version of a printable page for a web user, disposes a thumbnail reference of the at least one current web page on a portion of the generated print preview version and allows the web user to modify the preview version according to user preferences.

35. A system that facilitates printing from a web page comprising:

means for providing a plurality of web pages, means for partitioning at least one of the plurality of web pages and removing at least one part of the web page from printable view;

means for analyzing the plurality of web pages to facilitate identifying content and determining location of the content on at least a subset of the web pages to facilitate generating a user-defined printable page, the means for analyzing comprising comparing web crawler analysis of the plurality of web pages to results obtained via monitoring data from one or more feeds;

means for generating a preview version of the user-defined printable page with features that allow a user to further modify the generated preview version of the printable page; and means for disposing a thumbnail reference of the at least one current web page on a portion of the generated print preview version.

36. The system of claim 35, further comprising means for determining layout structure of at least a subset of the web pages based at least in part on content identified thereon.

* * * * *